United States Patent
Liao et al.

(10) Patent No.: US 8,630,203 B2
(45) Date of Patent: Jan. 14, 2014

(54) DATA TRANSMISSION METHOD AND APPARATUS

(75) Inventors: Junhua Liao, Shanghai (CN); Yanqiang Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 226 days.

(21) Appl. No.: 13/279,040

(22) Filed: Oct. 21, 2011

(65) Prior Publication Data

US 2012/0033579 A1 Feb. 9, 2012

Related U.S. Application Data

(63) Continuation of application No. 13/125,234, filed as application No. PCT/CN2009/072814 on Jul. 17, 2009.

(30) Foreign Application Priority Data

Jul. 17, 2008 (CN) .......................... 2008 1 0141665

(51) Int. Cl.
*H04W 24/00* (2009.01)

(52) U.S. Cl.
USPC ........... 370/252; 370/401; 370/336; 370/338; 370/235

(58) Field of Classification Search
USPC ...................... 370/336, 235, 230.1, 394, 395; 709/230, 250, 237, 235, 238, 227, 239, 709/240, 242

See application file for complete search history.

(56) References Cited

U.S. PATENT DOCUMENTS

| | | | |
|---|---|---|---|
| 6,173,333 B1 * | 1/2001 | Jolitz et al. ..................... | 709/240 |
| 2001/0032325 A1 * | 10/2001 | Fong et al. ...................... | 714/18 |
| 2002/0191564 A1 * | 12/2002 | Kuo ................................ | 370/333 |
| 2003/0007504 A1 * | 1/2003 | Berry et al. .................... | 370/465 |
| 2003/0179720 A1 | 9/2003 | Cuny | |
| 2004/0054796 A1 * | 3/2004 | Kikuchi et al. ................ | 709/229 |
| 2005/0058137 A1 | 3/2005 | Carlson et al. | |

(Continued)

FOREIGN PATENT DOCUMENTS

| | | |
|---|---|---|
| CN | 1271221 A | 10/2000 |
| CN | 1512377 A | 7/2004 |

(Continued)

OTHER PUBLICATIONS

Written Opinion of the International Searching Authority issued in corresponding PCT Patent Application No. PCT/CN2009/072814, mailed Oct. 29, 2009.

(Continued)

*Primary Examiner* — Rasheed Gidado
(74) *Attorney, Agent, or Firm* — Brinks Gilson & Lione

(57) ABSTRACT

A data transmission method includes receiving a data packet sent by a sender and recording information about the data packet received, sending the received data packet to a receiver through a protocol layer, looking up recorded information about data packets according to a data packet mapping after the protocol layer receives confirmation information of a data packet sent by the receiver to the sender. The data packet mapping is a relation between a recorded data packet and a data packet received by the protocol layer. The method further includes constructing an acknowledgement destined for the sender according to information about the data packet obtained by the steps of looking up recorded information about received data packets.

13 Claims, 9 Drawing Sheets

(56) References Cited

U.S. PATENT DOCUMENTS

| | | | |
|---|---|---|---|
| 2005/0141455 A1 | 6/2005 | Kim et al. | |
| 2005/0190720 A1 | 9/2005 | Miyake et al. | |
| 2006/0092836 A1* | 5/2006 | Kwan et al. | 370/229 |
| 2006/0098616 A1* | 5/2006 | Kish et al. | 370/338 |
| 2006/0136598 A1* | 6/2006 | Fischofer | 709/238 |
| 2006/0182025 A1* | 8/2006 | Kim et al. | 370/229 |
| 2006/0209853 A1 | 9/2006 | Hidaka et al. | |
| 2007/0133528 A1 | 6/2007 | Jin et al. | |
| 2007/0172208 A1* | 7/2007 | Okada et al. | 386/95 |
| 2008/0019330 A1 | 1/2008 | Hirano et al. | |
| 2008/0089250 A1 | 4/2008 | Jung | |
| 2009/0147683 A1* | 6/2009 | Mustafa | 370/235 |
| 2009/0154356 A1* | 6/2009 | Wiemann et al. | 370/236 |
| 2009/0201813 A1* | 8/2009 | Speight | 370/235 |
| 2009/0203374 A1* | 8/2009 | Chun et al. | 455/425 |

FOREIGN PATENT DOCUMENTS

| | | | |
|---|---|---|---|
| CN | 101138190 A | 3/2008 | |
| CN | 101335603 A | 12/2008 | |
| CN | 101335603 B | 3/2011 | |
| EP | 1045551 A2 | 10/2000 | |
| JP | 2001-036586 | 2/2001 | |
| JP | 2003-046432 | 2/2003 | |
| JP | 2005-236961 | 9/2005 | |
| JP | 2006-114973 | 4/2006 | |
| RU | 2006112570 A | 11/2007 | |
| RU | 2006129488 A | 2/2008 | |
| WO | WO 02/056631 A1 | 7/2002 | |

OTHER PUBLICATIONS

International Search Report issued in corresponding PCT Patent Application No. PCT/CN2009/072814, mailed Oct. 29, 2009.
Gomez, et al., eds., "End-to-End Quality of Service over Cellular Networks; Data Services Performance and Optimization in 2G/3G" Team LinG. Wiley and Sons Publishing, 2005.
Extended European Search Report issued in corresponding European Patent Application No. 09797404.2, mailed Nov. 24, 2011.
Office Action issued in corresponding Chinese Patent Application No. 201110052890.7, mailed Aug. 23, 2012.
Decision on Grant issued in corresponding Russian Patent Application No. 2011134389, mailed Sep. 6, 2012.
Office Action issued in corresponding Japanese Patent Application No. 2011-517740, mailed Sep. 11, 2012.
Office Action issued in corresponding Chinese Patent Application No. 201110052890.7, mailed Feb. 18, 2013.
Office Action issued in corresponding Russian Patent Application No. 2011134389/08, mailed Jun. 1, 2012.
Office Action issued in corresponding Japanese Patent Application No. 2011-517740, mailed Jun. 25, 2013, 4 pages.
Stevens, W. R. "Chapter 18. TCP Connection Establishment and Termination" TCP/IP Illustrated vol. 1: The Protocols/ Addison-Wesley. 1994:297-322.
Office Action issued in corresponding Canadian Patent Application No. 2,738,103, mailed Jan. 14, 2013.
Office Action issued in commonly owned U.S. Appl. No. 13/125,234, mailed Aug. 2, 2013, 26 pages.
Office Action issued in corresponding Chinese Patent Application No. 201110052890.7, mailed Aug. 12, 2013, 24 pages.

* cited by examiner

DATA TRANSMISSION METHOD AND APPARATUS

CROSS-REFERENCE TO RELATED APPLICATIONS

This application is a continuation of U.S. patent application Ser. No. 13/125,234, filed on Apr. 20, 2011, which is a national stage entry of International Application No. PCT/CN2009/072814, filed on Jul. 17, 2009. The application PCT/CN2009/072814 claims priority to Chinese Patent Application No. 200810141665.9, filed on Jul. 17, 2008. The aforementioned patent applications are hereby incorporated by reference in their entireties.

FIELD OF THE DISCLOSURE

The present disclosure relates to the mobile communication field, and in particular, to a data transmission method and apparatus.

BACKGROUND

A transmission control protocol (TCP) is generally applied to the packet switched (PS) services in a wireless field. A wireless network is characterized by features such as high delay, variable data rate, asymmetry, delay peak, and bandwidth jitter, which may affect the performance of TCP. With the development of data services, quality of service (QoS) required by a user is becoming higher and higher. Therefore, a need arises to enhance the transmission performance of TCP in a radio bearer.

When data transmission occurs in the uplink and downlink directions simultaneously, the transmission process includes an upload process and a download process. In the upload process, a terminal sends a data packet to a server. After receiving an acknowledge (ACK) packet from the server, the terminal slides the window to send a new data packet. In the download process, the server sends a data packet to the terminal. after receiving an ACK packet from the terminal, the server slides the window to send a new data packet. When the server sends a data packet, the server also sends an ACK packet corresponding to the uplink data packet. When the terminal sends a data packet, the terminal also sends an ACK packet corresponding to the downlink data packet.

The throughput performance demonstrated when data is transmitted in both uplink and downlink simultaneously is an important performance indicator for evaluating a wireless system. However, in the existing network, the data rate in the downlink direction is low and unstable when data is transmitted in both uplink and downlink directions simultaneously, because the ACK corresponding to the downlink data packet is generally arranged after the uplink data packet at the TCP layer of the terminal, which leads to the delay of the ACK corresponding to the downlink data packet. Therefore the performance of the downlink data transmission is negatively affected and user experience is poor.

SUMMARY

A data transmission method provided in an embodiment of the present disclosure includes:
receiving a data packet sent by a sender; sending the data packet received to a receiver through a protocol layer; after the protocol layer receives from the receiver confirmation information of the data packet, obtaining information about a corresponding data packet according to the confirmation information; and constructing an acknowledgement (ACK) destined for the sender according to obtained information about the corresponding data packet.

A data transmission apparatus provided in an embodiment of the present disclosure includes:
a receiving unit, configured to receive a data packet sent by a sender, and record information about the data packet received; a sending unit, configured to send the data packet received to a receiver through a protocol layer; a looking-up unit, configured to look up recorded information about the data packet according to a data packet mapping after the protocol layer receives from the receiver confirmation information of the data packet, wherein the data packet mapping comprises a relation between a recorded data packet and a data packet received by the protocol layer; and a constructing unit, configured to construct an Acknowledgement, ACK, destined for the sender according to the information about the data packet obtained by the looking-up unit.

An intermediate Network Element (NE) provided in an embodiment of the present disclosure includes a protocol layer and the data transmission apparatus discussed above. The protocol layer may be any protocol layer of the intermediate NE, and a confirmation mechanism exists between this protocol layer and a receiver. The receiver returns confirmation information to the protocol layer upon receiving a data packet.

A data packet mapping may be shared between the protocol layer and the data transmission apparatus. After the protocol layer receives the confirmation information returned by the receiver, the data transmission apparatus constructs an ACK and sends it to the sender according to the data packet mapping.

By using the method and apparatus provided in the embodiments of the present disclosure, an ACK is constructed and sent to the sender after a protocol layer receives confirmation information returned by the receiver.

DETAILED DESCRIPTION OF THE EMBODIMENTS

Figure 1:
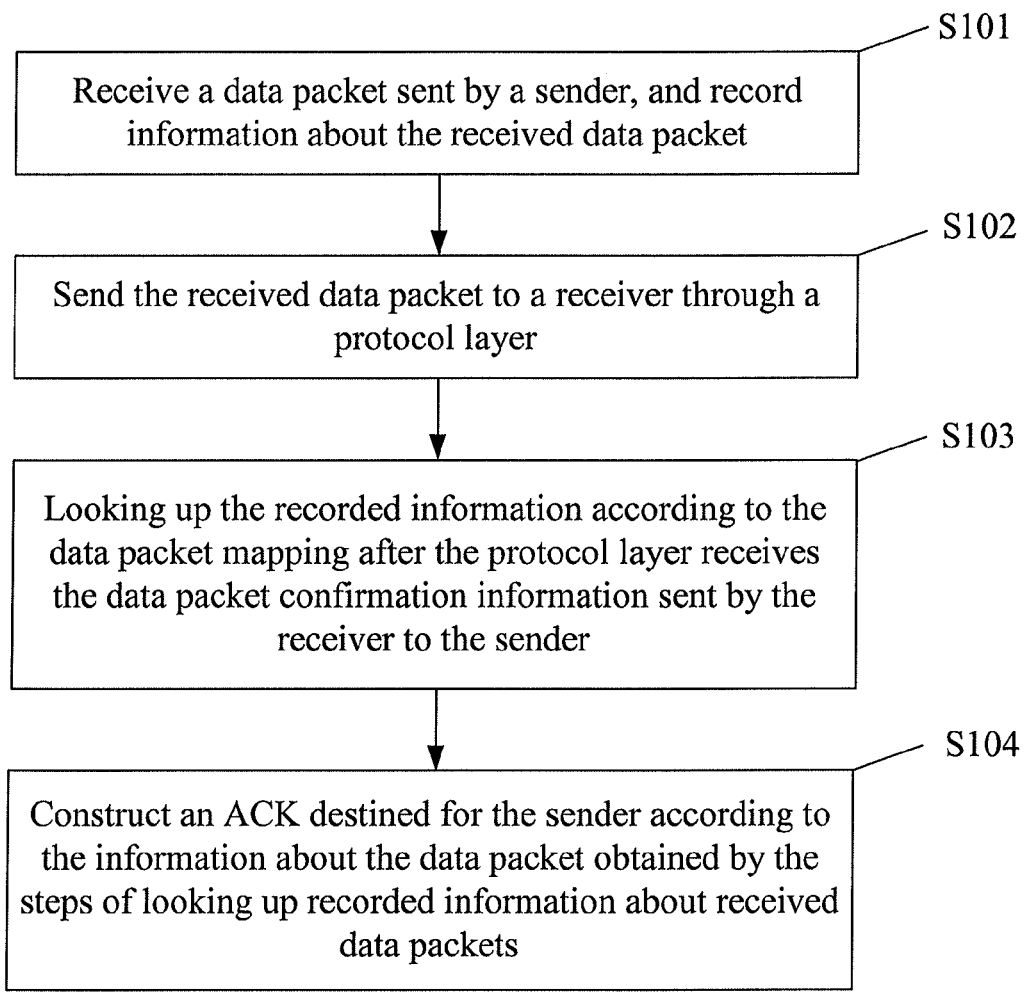
FIG. 1 is a flowchart of a data transmission method according to an embodiment of the present disclosure.

A data transmission method is provided in an embodiment of the present disclosure. The data transmission process can be implemented by a TCP function enhancement entity, e.g. a TCP proxy which is added in an intermediate node in the data transmission process between the sender and the receiver. FIG. 1 is a flowchart of a data transmission method according to an embodiment of the present disclosure. As shown in FIG. 1, the method may include the following steps:

S101. Receive a data packet sent by a sender, and record information about the received data packet.

After the data packet is received from the sender, the sequence number (SN) of the data packet is recorded according to the order of receiving data packets. The SN may increase in an ascending order. For example, the first data packet received is identified by SN 1, and the second data packet received is identified by SN 2, and so on. The number of digits of the SN of the data packet may be not limited, but a too long SN may cause inconvenience of recording. Therefore, the SN may start over again if the SN reaches a certain value. For example, if the SN reaches 65535, the SN may start over from 1 again. In this way, plenty of data packets can be accommodated. If the received data packet is a TCP packet, the packet length and the TCP sequence number may be recorded.

S102. Send the received data packet to the receiver through a protocol layer.

The received data packet may be sent to the receiver through a protocol layer. The protocol layer may be a Radio Link Control (RLC) layer. The protocol layer may also record information about the received data packet, for example, record the SN of the data packet according to the order of receiving the data packet.

S103. Look up the recorded information about data packets according to the data packet mapping after the protocol layer receives the confirmation information of a data packet sent by the receiver to the sender.

The data packet mapping reflects the relation between the recorded data packet and the data packet received by the protocol layer. The data packet mapping may be a table. The data packet mapping may be generated in the following way: because the information about the received data packet is recorded in step S101, and the protocol layer also records the SN of the received data packet, which uniquely corresponds to the SN of the data packet recorded by the TCP proxy. For example, if the first data packet received by the TCP proxy is identified by SN 1, the first data packet received by the protocol layer is also identified by SN 1. Therefore, the order of the data packets recorded by the protocol layer corresponds to the order of the data packets recorded by the TCP proxy in a one-to-one relation. The one-to-one relation is called a data packet mapping.

It should be noted that the TCP function enhancement entity may be deployed in different positions of the network, for example, including but not limited to: the Internet, core network, or radio access network. Likewise, the protocol layer may also be deployed in different positions of the network.

A confirmation mechanism exists between the protocol layer and the receiver. After receiving the data packet from the sender, the receiver returns confirmation information to the protocol layer.

After receiving the confirmation information from the receiver, the protocol layer may determine which data packets are correctly received by the receiver. Therefore, the corresponding information about the data packets is found according to the generated data packet mapping, thus it is easy to determine which data packets forwarded by the TCP function enhancement entity are correctly received by the receiver.

In addition, the data packet mapping may be stored at the protocol layer, or stored into the TCP function enhancement entity. The data packet mapping is shared between the TCP function enhancement entity and the protocol layer.

It should be noted that in this embodiment, the mode of recording information of the received data packet is exemplary only. The information of the received data packet may be recorded in other modes as long as the corresponding information of a data packet can be found through the data packet mapping according to the recorded SN.

S104. Construct an ACK destined for the sender according to the information about the data packet obtained by the steps of looking up recorded information about received data packets.

The sender continues to send data packets to the receiver after receiving the ACK from the receiver. To prevent the ACK from being blocked at the receiver, the TCP function enhancement entity, e.g. a TCP proxy may construct an ACK and send it to the sender.

If the protocol layer has received the confirmation information from the receiver but the TCP proxy has received no TCP ACK from the receiver in response to the data packet, it can be determined that the receiver has received the data packet sent by the sender correctly, and the TCP proxy may construct an ACK and send the ACK to the sender. The ACK may be constructed according to the information about the data packet found through the data packet mapping. The information about the data packet may include SN. If the data packet is a TCP packet, the information about the data packet may further include the TCP sequence number and packet length of the TCP packet, and therefore, the SN of the constructed ACK may be the TCP sequence number plus the packet length of the TCP packet. For other types of data packets, the ACK may be constructed in other ways according to specific conditions. The TCP proxy sends the constructed ACK to the sender, and records the SN of the constructed ACK.

In the data transmission method provided in this embodiment, an ACK is constructed actively and sent to the sender through a TCP function enhancement entity, e.g. a TCP proxy, added in an intermediate node in the data transmission process between the sender and the receiver.

In the case that a TCP function enhancement entity, e.g. a TCP proxy, is added in the intermediate node in the data transmission process between the sender and the receiver, before the ACK is constructed, a judgment about whether the TCP ACK returned by the receiver in response to the corresponding data packet has been received may be made. If no such TCP ACK has been received, an ACK is constructed and sent to the sender. Additionally, after the TCP ACK is received from the receiver, a judgment about whether the corresponding ACK has been constructed and sent to the sender may be made. The TCP ACK is forwarded to the sender if no such ACK has been constructed, and the TCP ACK returned by the receiver is discarded if such an ACK has been constructed. That is because, if the SN of the ACK received subsequently by the sender is smaller than the SN of the ACK received previously by the sender, the sender will discard the ACK of the smaller SN. The following describes the method with reference to embodiments.

Figure 2:
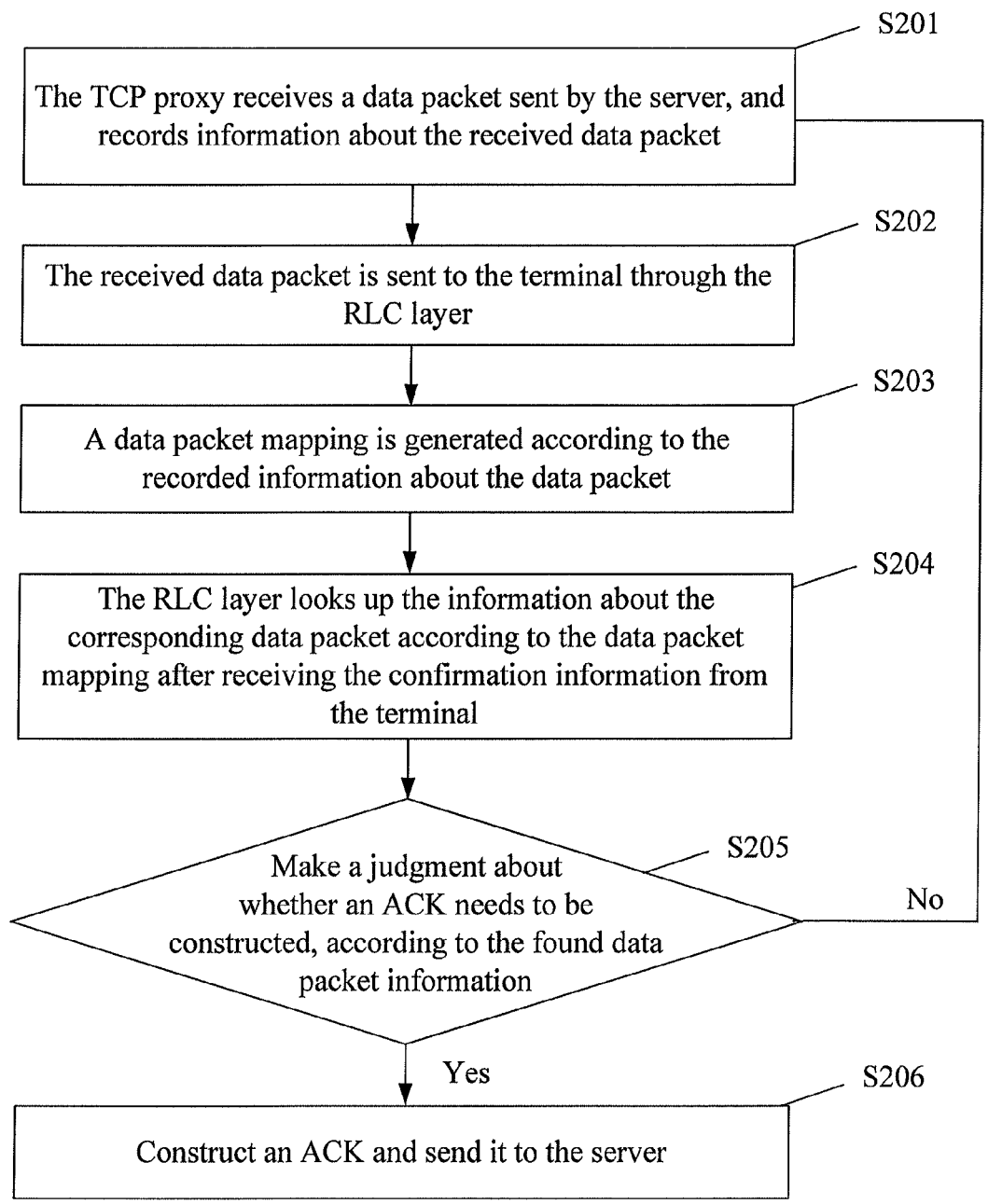
FIG. 2 is a flowchart of a data transmission method according to another embodiment of the present disclosure.

A data transmission method is provided in another embodiment of the present disclosure. In this embodiment, the sender is a server, the receiver is a terminal, the TCP function enhancement entity added in the intermediate node in the data transmission process between the sender and the receiver is a TCP proxy, and the protocol layer is an RLC layer. FIG. 2 is a flowchart of a data transmission method according to another embodiment of the present disclosure. As shown in FIG. 2, the method may include the following steps.

S201. The TCP proxy receives a data packet sent by the server, and records information about the received data packet.

For the downlink transmission process, the data packet sent by the server to the terminal is forwarded through a TCP proxy, and therefore, all the data packets pass through the TCP proxy. Thus the SN of the data packet can be recorded according to the order of receiving the data packet. The SN may increase in ascending order. For example, the first data packet received is identified by SN 1, and the second data packet received is identified by SN 2, and so on. If the received data packet is a TCP packet, the packet length and the TCP SN of the TCP packet may be recorded. The information about the data packet length and the TCP SN of the TCP packet may be obtained from the packet header information of the TCP packet.

S202. Send the received data packet to the terminal through the RLC layer.

The received data packet may be sent to the terminal through the RLC layer, and the RLC layer may also record information about the received data packet, for example, record the SN of the data packet according to the order of receiving the data packet.

S203. Generate a data packet mapping according to the recorded information about the data packet.

The generated data packet mapping may be stored in the form of a data packet mapping table.

The data packet mapping may be stored on a TCP proxy or an RLC layer. The data packet mapping is shared between the TCP proxy and the RLC layer. In this embodiment, it is assumed that the TCP proxy generates the data packet mapping.

The RLC layer may also record the SN of the received data packet. That is, if the first data packet received by the TCP proxy is identified by SN 1, the first data packet received by the RLC layer is also identified by SN 1, and so on. Therefore, the order of the data packets recorded by the RLC layer corresponds to the order of the data packets recorded by the TCP proxy in a one-to-one relation. The one-to-one relation is called a data packet mapping.

S204. The RLC layer looks up the corresponding information according to the data packet mapping after receiving the confirmation information from the terminal.

The term terminal as used here may include a terminal device and its protocol layer(s).

The RLC layer may work in two modes: confirmation, and non-confirmation. The data transmission confirmation mechanism between the RLC layer and the terminal is utilized here. When passing through the RLC layer, the service data unit (SDU) is split into protocol data units (PDUs) which are sent to the terminal. After receiving the PDUs, the terminal returns confirmation information to the RLC layer, indicating that the terminal has received the data packet from the server. The RLC layer may determine which data packets are correctly received by the terminal according to the confirmation information received from the terminal, and then which data packets on the TCP proxy are received by the terminal may be determined by looking up the data packet mapping in step S202. Because the TCP proxy also records the information about the data packet, e.g. the packet length and SN of the TCP packet, the information about the corresponding data packet can be found.

S205. Make a judgment about whether it is necessary to construct an ACK, according to the found information about the data packet.

The TCP proxy also records the SN of the TCP ACK which is sent to the TCP proxy from the terminal.

The information about the data packet may include the SN of the data packet. If the data packet is a TCP packet, the information about the data packet may include the packet length and the SN of the TCP packet. According to the found information about the data packet, the SN of the ACK to be constructed may be determined. For example, for a TCP packet, if the SN of the first data packet is 1 and the packet length is 1460, the SN of the ACK to be constructed is 1461, and if the SN of the second data packet is 1461, the SN of the ACK to be constructed is 2921, and so on. For other types of data packets, the ACK may be constructed in other modes.

The SN of the TCP ACK returned by the terminal and recorded in the TCP proxy may be compared with the SN of the ACK to be constructed to determine whether it is necessary to construct an ACK. The TCP proxy may record at least one SN of the TCP ACK returned by the terminal. The maximum SN of the TCP ACK recorded in the TCP proxy is compared with the SN of the ACK to be constructed. If the maximum SN of the TCP ACK returned by the terminal and recorded in the TCP proxy is greater than or equal to the SN of the ACK to be constructed, it indicates that the TCP proxy has received the TCP ACK sent by the terminal and that no more ACK needs to be constructed, and therefore, step S201 and the subsequent steps need to be repeated. If the maximum SN of the TCP ACK returned by the terminal and recorded in the TCP proxy is smaller than the SN of the ACK to be constructed, it indicates that the TCP proxy has not received the TCP ACK returned by the terminal and that an ACK needs to be constructed, and therefore, step S206 is performed.

S206. Construct an ACK and send it to the server.

If the TCP proxy has not received the TCP ACK returned by the terminal, the TCP proxy constructs an ACK actively and sends it to the server. After receiving the ACK, the server can slide the window to send new data.

The SN of the constructed ACK is the packet length of the TCP packet plus the SN of the TCP packet. For example, if the SN of the first data packet is 1, and the packet length of the first data packet is 1460, the SN of the constructed ACK is 1461. If the SN of the second data packet is 1461, and the packet length of the second data packet is 1460, the SN of the constructed ACK is 2921, and so on. The SN of the constructed ACK may be recorded in the TCP proxy.

In addition, if the TCP proxy receives the TCP ACK returned by the terminal, the TCP proxy may compare the SN of the TCP ACK returned by the terminal with the SN of the constructed ACK recorded in the TCP proxy. The TCP proxy may record more than one constructed ACK. The SN of the TCP ACK returned by the terminal may be compared with the maximum recorded SN of the constructed ACK. If the SN of the TCP ACK returned by the terminal is smaller than or equal to the maximum recorded SN of the constructed ACK, it indicates that the TCP proxy has sent the corresponding ACK to the server, and the TCP proxy discards the ACK sent by the terminal instead of forwarding the ACK to the server. If the SN of the TCP ACK returned by the terminal is greater than the maximum recorded SN of the constructed ACK, the TCP proxy forwards the TCP ACK returned by the terminal to the server, and records the SN of the TCP ACK returned by the terminal.

Therefore, through the data transmission method provided in this embodiment, the TCP proxy constructs an ACK and sends it to the server.

Figure 3:
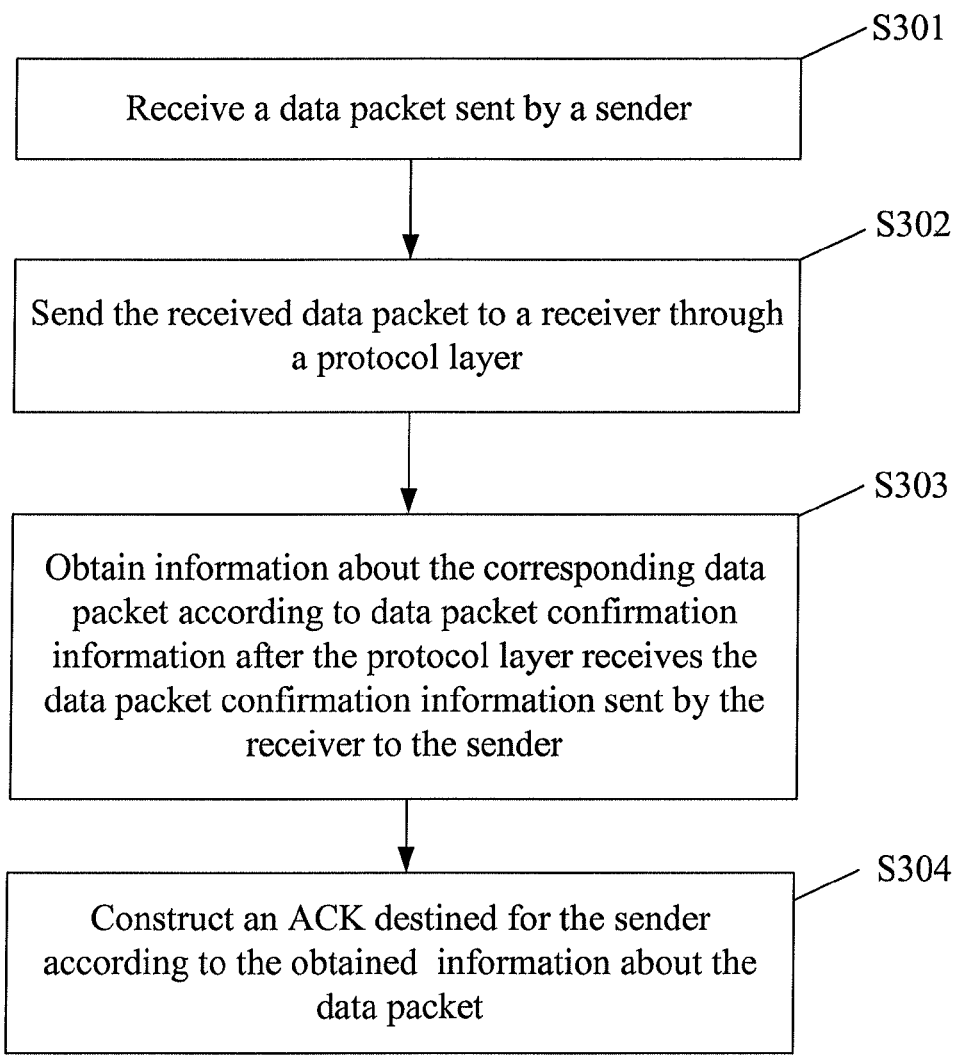
FIG. 3 is a flowchart of a data transmission method according to another embodiment of the present disclosure.

A data transmission method is provided in another embodiment of the present disclosure. The data transmission process can be implemented by a TCP function enhancement entity, e.g. a TCP proxy, added in an intermediate node in the data transmission process between the sender and the receiver. FIG. 3 is a flowchart of a data transmission method according to another embodiment of the present disclosure. As shown in FIG. 3, the method may include the following steps.

S301. Receive a data packet sent by a sender.

S302. Send the received data packet to a receiver through a protocol layer.

The TCP function enhancement entity receives the data packet sent by the sender, and sends the data packet to the receiver through the protocol layer. The TCP function enhancement entity may be deployed in different positions of the network, including but not limited to: the Internet, core network, and RAN. The protocol layer may also be deployed in different positions of the network. For example, the protocol layer may be an RLC layer.

S303: After the protocol layer receives the confirmation information of a data packet sent by the receiver to the sender, obtain information about a corresponding data packet according to the confirmation information.

A confirmation mechanism exists between the protocol layer and the receiver. After receiving the data packet from the sender, the receiver returns confirmation information of a data packet to the protocol layer. Through the confirmation information, the protocol layer may determine which data packets are correctly received by the receiver, may determine which data packets forwarded by the TCP function enhancement entity are correctly received by the receiver, and can further obtain the information about such data packets. The information about the data packet may be an SN of the data packet. If the data packet is a TCP packet, the information about the data packet may further include the TCP SN and packet length of the TCP packet. The packet length and the TCP SN of the TCP packet may be obtained from the packet header information of the TCP packet.

S304. Construct an ACK destined for the sender according to the obtained information about the data packet.

The sender continues to send the next data packet to the receiver after receiving the ACK from the receiver. To prevent the ACK from being blocked at the receiver, a TCP function enhancement entity, a TCP proxy for example, may construct an ACK according to the obtained information about the data packet and send it to the sender.

When the protocol layer receives the confirmation information from the receiver, it can be determined that the receiver has correctly received the data packet sent by the sender, and the TCP proxy can construct an ACK and send it to the sender. The ACK may be constructed in this way: If the data packet is a TCP packet, the information about the data packet further includes the TCP SN and packet length of the TCP packet, and therefore, the SN of the constructed ACK may be the TCP SN of the TCP packet plus the packet length of the TCP packet. For other types of data packets, the ACK may be constructed in other ways according to specific conditions.

In the data transmission method provided in this embodiment, an ACK is constructed and sent to the sender actively through a TCP function enhancement entity, for example a TCP proxy, added in an intermediate node in the data transmission process between the sender and the receiver.

Before the ACK is constructed, a judgment about whether the TCP ACK returned by the receiver in response to the corresponding data packet has been received may be made. If no such TCP ACK has been received, an ACK is constructed and sent to the sender. After the TCP ACK is received from the receiver, a judgment about whether the corresponding ACK has been constructed and sent to the sender may be made. The TCP ACK is forwarded to the sender if no such ACK has been constructed, and the TCP ACK returned by the receiver is discarded if such an ACK has been constructed. That is because, if the SN of the ACK received subsequently by the sender is smaller than the SN of the ACK received previously by the sender, the sender will discard the ACK of the smaller SN.

Figure 4:
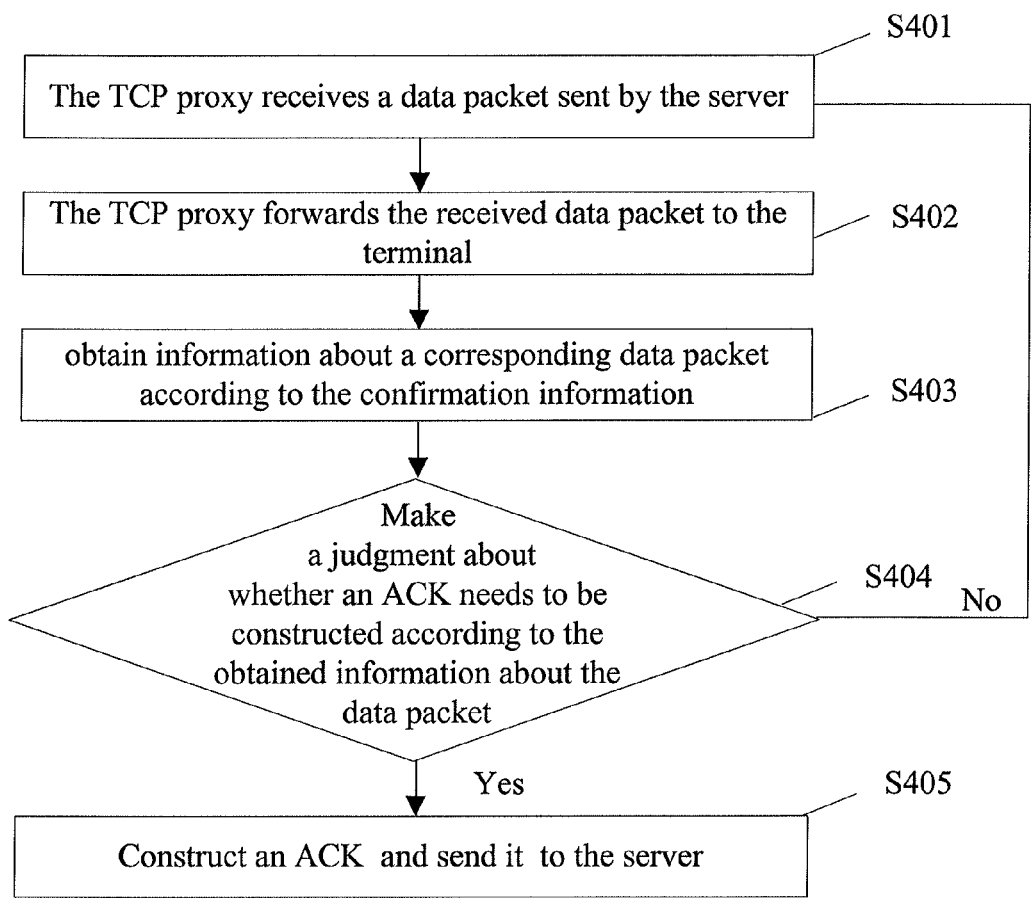
FIG. 4 is a flowchart of a data transmission method according to another embodiment of the present disclosure.

A data transmission method is provided in another embodiment of the present disclosure. In this embodiment, the sender is a server, the receiver is a terminal, the TCP function enhancement entity added to the intermediate node in the data transmission process between the sender and the receiver is a TCP proxy, and the protocol layer is an RLC layer. FIG. 4 is a flowchart of a data transmission method according to another embodiment of the present disclosure. As shown in FIG. 4, the method may include the following steps.

S401. The TCP proxy receives a data packet sent by the server.

S402. The TCP proxy forwards the received data packet to the terminal.

It should be noted that the term terminal as used here may include a terminal device and its protocol layer such as the RLC layer. A confirmation mechanism exists between the RLC layer and the terminal device. After receiving PDUs, the terminal device returns confirmation information of a data packet to the RLC layer, indicating that the terminal received the data packet from the server.

S403. After the RLC layer receives confirmation information of a data packet from the terminal device, the RLC layer obtains information about a corresponding data packet according to the confirmation information.

Through the confirmation information received from the terminal device, the RLC layer may determine which data packets are correctly received by the terminal device, determine which data packets from the TCP proxy are received by the terminal device, and obtain the information about the corresponding data packet. The information about the data packet may be an SN of the data packet. If the data packet is a TCP packet, the information about the data packet may further include the SN and packet length of the TCP packet.

S404. Make a judgment about whether it is necessary to construct an ACK according to the obtained information about the data packet.

For the TCP ACK sent by the terminal device to the TCP proxy, the TCP proxy may record the SN of the TCP ACK. The confirmation information serves as a basis for obtaining the corresponding information about the data packet and determining the SN of the ACK to be constructed. For example, if the SN of the first data packet is 1 and the packet length is 1460, the SN of the ACK to be constructed is 1461, and if the SN of the second data packet is 1461, the SN of the ACK to be constructed is 2921, and so on.

The SN of the TCP ACK returned by the terminal and recorded in the TCP proxy may be compared with the SN of the ACK to be constructed to determine whether it is necessary to construct an ACK. The TCP proxy may record at least one SN of the TCP ACK returned by the terminal. The maximum SN of the TCP ACK recorded in the TCP proxy is compared with the SN of the ACK to be constructed. If the maximum SN of the TCP ACK returned by the terminal and recorded in the TCP proxy is greater than or equal to the SN of the ACK to be constructed, it indicates that the TCP proxy has received the TCP ACK sent by the terminal and that no more ACK needs to be constructed; if the maximum SN of the TCP ACK returned by the terminal and recorded in the TCP proxy is smaller than the SN of the ACK to be constructed, it indicates that the TCP proxy has received no TCP ACK returned by the terminal and that an ACK needs to be constructed, and therefore, step S405 is performed.

S405. Construct an ACK and send it to the server.

Because the TCP proxy has not received the TCP ACK returned by the terminal, the TCP proxy constructs an ACK actively and sends it to the server. After receiving the ACK, the server can slide the window to send new data.

The ACK may be constructed in this way: If the data packet is a TCP packet, the information about the data packet further includes the TCP SN and packet length of the TCP packet, and therefore, the SN of the constructed ACK may be the TCP SN of the TCP packet plus the packet length of the TCP packet. For example, the SN of the first data packet is 1, the packet length of the first data packet is 1460, and therefore, the SN of the constructed ACK is 1461. If the SN of the second data packet is 1461, the packet length of the second data packet is 1460, and therefore, the SN of the constructed ACK is 2921, and so on. For other types of data packets, the ACK may be constructed in other ways according to specific conditions. In addition, if the TCP proxy receives the TCP ACK returned by the terminal, the TCP proxy may compare the SN of the TCP ACK returned by the terminal with the SN of the ACK constructed in the TCP proxy. The TCP proxy may record more than one constructed ACK. The SN of the TCP ACK returned by the terminal may be compared with the maximum SN of the constructed ACK. If the SN of the TCP ACK returned by the terminal is smaller than or equal to the maximum SN of the constructed ACK, it indicates that the TCP proxy has sent the corresponding ACK to the server, and the TCP proxy discards the ACK sent by the terminal instead of forwarding the ACK to the server. If the SN of the TCP ACK returned by the terminal is greater than the maximum SN of the constructed ACK, the TCP proxy forwards the ACK returned by the terminal to the server, and records the SN of the TCP ACK returned by the terminal.

Through the data transmission method provided in this embodiment, the TCP proxy constructs an ACK and sends it to the server.

Figure 5:
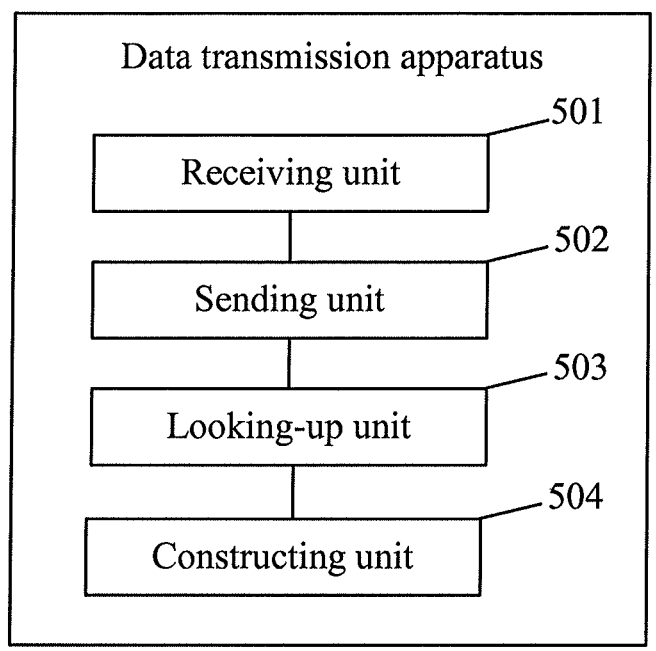
FIG. 5 shows a structure of a data transmission apparatus according to an embodiment of the present disclosure.

A data transmission apparatus is provided in an embodiment of the present disclosure. As shown in FIG. 5, the apparatus may include a receiving unit 501, a sending unit 502, a looking-up unit 503, and a constructing unit 504.

The receiving unit 501 is configured to receive a data packet sent by a sender, and record information about the received data packet.

After the data packet is received from the sender, the SN of the data packet is recorded according to the order of receiving the data packet. The SN may increase in ascending order. For example, the first data packet received is identified by SN 1, and the second data packet received is identified by SN 2, and so on. The SN may start over again if the SN reaches a certain value. For example, if the SN reaches 65535, the SN may start over from 1. If the received data packet is a TCP packet, the packet length and the SN of the TCP packet may be recorded.

The sending unit 502 is configured to send the received data packet to a receiver through a protocol layer.

The received data packet may be sent to the receiver through a protocol layer. The protocol layer may be an RLC layer. The protocol layer may also record the received data packet, for example, record the SN of the data packet according to the order of receiving the data packet.

The looking-up unit 503 is configured to look up the information about the corresponding data packet through the receiving unit 501 according to the generated data packet mapping after the protocol layer receives the confirmation information of a data packet sent by the receiver to the sender.

A confirmation mechanism exists between the protocol layer and the receiver. After receiving the data packet from the sender, the receiver returns confirmation information to the protocol layer.

The data packet mapping reflects the corresponding relation between the data packet on the data transmission apparatus and the data packet received by the protocol layer. The data packet mapping may be a mapping table. The data packet mapping may be generated in the following way: because the receiving unit 501 records the information about the received data packet, and the protocol layer also records the SN of the received data packet, the SN of the received data packet recorded by the protocol layer uniquely corresponds to the SN of the data packet recorded by the TCP proxy. That is, if the first data packet received by the TCP proxy is identified by SN 1, the first data packet received by the protocol layer is also identified by SN 1, and so on. Therefore, the order of the data packets recorded by the protocol layer corresponds to the order of the data packets recorded by the receiving unit 501 in a one-to-one relation. The one-to-one relation is called a data packet mapping.

After receiving the confirmation information from the receiver by the protocol layer, which data packets are correctly received by the receiver may be determined. Therefore, once the corresponding information about the data packet is found according to the generated data packet mapping, it is easy to determine which data packets on the data transmission apparatus are correctly received by the receiver.

The constructing unit 504 is configured to construct an ACK destined for the sender according to the information about the data packet found by the looking-up unit 503.

If the protocol layer has received the confirmation information from the receiver but the data transmission apparatus has not received the ACK from the receiver in response to the data packet, it can be determined that the receiver has correctly received the data packet sent by the sender, and the constructing unit 504 may construct an ACK and send it to the sender. The ACK is constructed according to the information about the data packet found by the looking-up unit 503. The information about the data packet may be an SN of the data packet. If the data packet is a TCP packet, the information about the data packet may include the TCP SN and packet length of the TCP packet. The ACK may be constructed according to the information about the data packet found through the data packet mapping. If the data packet is a TCP packet, the SN of the constructed ACK may be the TCP SN plus the packet length of the TCP packet. For other types of data packets, the ACK may be constructed in other ways according to specific conditions.

The constructing unit 504 sends the constructed ACK to the sender, and may record the SN of the constructed ACK.

The data transmission apparatus may be a TCP function enhancement entity, e.g. a TCP proxy, added in an intermediate node in the data transmission process between the sender and the receiver.

The data transmission apparatus provided in this embodiment constructs an ACK and sends it to the sender actively.

Further, before the ACK is constructed, the data transmission apparatus may judge whether the TCP ACK returned by the receiver in response to the corresponding data packet has been received. If no such TCP ACK has been received, the data transmission apparatus constructs an ACK and sends it to the sender. After receiving the TCP ACK from the receiver, the data transmission apparatus may judge whether the ACK has been constructed and sent to the sender, and forward the TCP ACK to the sender if no such ACK has been constructed or discard the TCP ACK returned by the receiver if such an ACK has been constructed.

Figure 6:
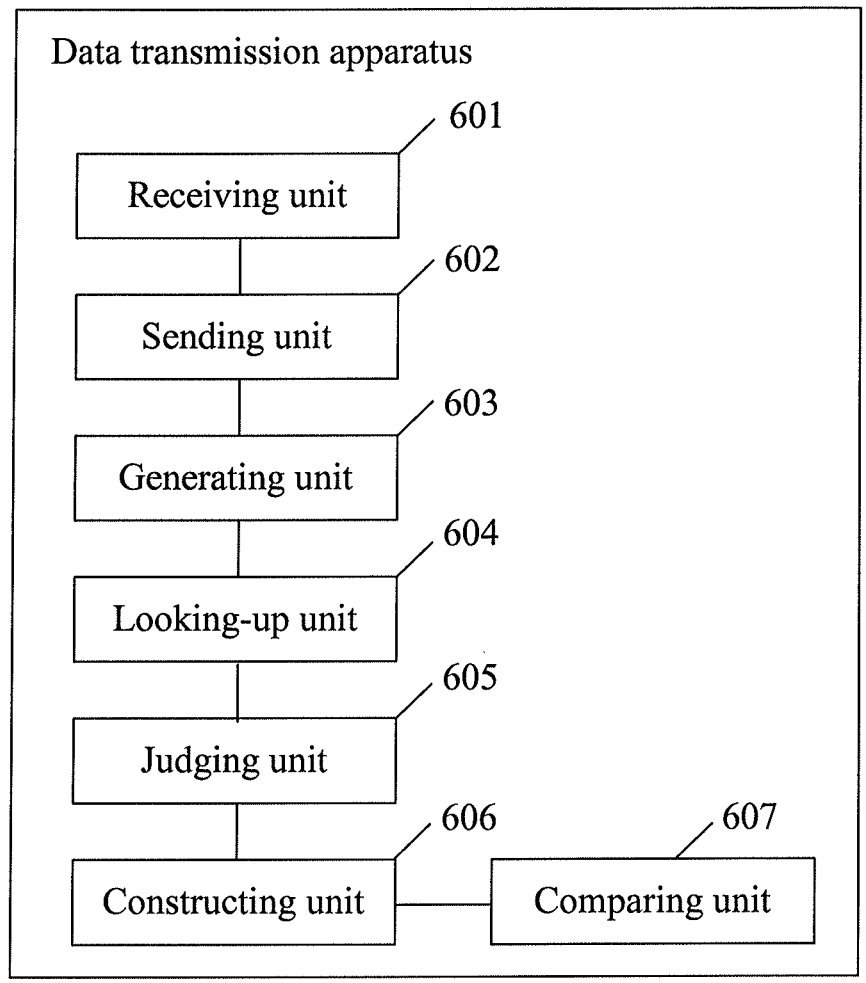
FIG. 6 shows a structure of a data transmission apparatus according to another embodiment of the present disclosure.

Another data transmission apparatus is provided in another embodiment of the present disclosure. As shown in FIG. 6, the apparatus may include a receiving unit 601, a sending unit 602, a generating unit 603, a looking-up unit 604, a judging unit 605, a constructing unit 606, and a comparing unit 607.

The receiving unit 601 is configured to receive a data packet sent by a sender, and record information about the received data packet.

The functions and the implementation process of the receiving unit 601 are basically the same as those of the receiving unit 501 in the previous embodiment described above.

The sending unit 602 is configured to send the data packet to a receiver through a protocol layer, where the data packet is received by the receiving unit 601.

The functions and the implementation process of the sending unit 602 are basically the same as those of the sending unit 502 in the previous embodiment described above.

The generating unit 603 is configured to generate a data packet mapping according to the information about the data packet recorded by the receiving unit 601.

The data packet mapping may be stored in the data transmission apparatus or at the protocol layer. A confirmation mechanism exists between the protocol layer and the receiver. After receiving the data packet from the sender, the receiver returns confirmation information to the protocol layer. The data packet mapping is shared between the data transmission apparatus and the protocol layer. In this embodiment, it is assumed that the data transmission apparatus generates the data packet mapping.

The protocol layer also records the SN of the received data packet. That is, if the first data packet received by the receiving unit 601 is identified by SN 1, the first data packet received by the protocol layer is also identified by SN 1, and so on. Therefore, the order of the data packets recorded by the protocol layer corresponds to the order of the data packets recorded by the receiving unit 601 in a one-to-one relation. The one-to-one relation is called a data packet mapping relation.

The looking-up unit 604 is configured to look up the information about the corresponding data packet through the receiving unit 601 according to the data packet mapping generated by the generating unit 603 after the protocol layer receives the confirmation information of a data packet sent by the receiver to the sender.

The functions of the looking-up unit 604 are basically the same as those of the searching unit 503 in the previous embodiment described above.

The judging unit 605 is configured to judge whether it is necessary to construct an ACK according to the information about the data packet found by the looking-up unit 604.

For the TCP ACK sent by the receiver to the data transmission apparatus, the judging unit 605 of the data transmission apparatus also records the SN of the ACK.

The information about the data packet may include the SN of the data packet. If the data packet is a TCP packet, the information of the data packet may include the packet length and the SN of the TCP packet. According to the found information about the data packet, the SN of the ACK to be constructed may be determined. For example, for a TCP packet, if the SN of the first data packet is 1 and the packet length is 1460, the SN of the ACK to be constructed is 1461, and if the SN of the second data packet is 1461, the SN of the ACK to be constructed is 2921, and so on. For other types of data packets, the ACK may be constructed in other modes.

The SN of the TCP ACK returned by the terminal and recorded in the judging unit 605 is compared with the SN of the ACK to be constructed to determine whether an ACK is needed to be constructed. The judging unit 605 may record at least one SN of the TCP ACK returned by the terminal. The maximum SN of the TCP ACK recorded in the judging unit 605 is compared with the SN of the ACK to be constructed. If the maximum SN of the TCP ACK returned by the receiver and recorded in the judging unit 605 is greater than or equal to the SN of the ACK to be constructed, it indicates that the data transmission apparatus has received the TCP ACK returned by the receiver and that no more ACK needs to be constructed; if the maximum SN of the TCP ACK returned by the receiver and recorded in the judging unit 605 is smaller than the SN of the ACK to be constructed, it indicates that the data transmission apparatus has received no TCP ACK returned by the receiver and that an ACK needs to be constructed.

The constructing unit 606 is configured to construct an ACK and send it to the sender if the judging unit 605 determines that the ACK is needed to be constructed.

If the data transmission apparatus has not received the TCP ACK returned by the receiver, the constructing unit 606 of the data transmission apparatus constructs an ACK actively and sends it to the sender. After receiving the ACK, the sender can slide the window to send new data.

The SN of the constructed ACK is the packet length plus the SN of the TCP packet. For example, the SN of the first data packet is 1, the packet length of the first data packet is 1460, and therefore, the SN of the constructed ACK is 1461. The SN of the second data packet is 1461, the packet length of the second data packet is 1460, and therefore, the SN of the constructed ACK is 2921, and so on. The SN of the constructed ACK may be recorded in the data transmission apparatus.

If the data transmission apparatus receives the TCP ACK returned by the receiver, the data transmission apparatus may judge whether the constructing unit 606 has constructed the corresponding ACK and sent it to the sender, and forward the TCP ACK to the sender if no such ACK has been constructed, or discard the TCP ACK returned by the receiver if such an ACK has been constructed. The data transmission apparatus may further include a comparing unit 607. The comparing unit 607 is configured to compare the SN of the TCP ACK returned by the receiver with the SN of the constructed ACK recorded in the data transmission apparatus.

If the SN of the TCP ACK returned by the receiver is smaller than or equal to the maximum recorded SN of the constructed ACK, it indicates that the data transmission apparatus has sent the confirmation information to the sender, and the data transmission apparatus may discard the ACK sent by the receiver rather than forward the ACK to the sender; if the SN of the TCP ACK returned by the receiver is greater than the maximum recorded SN of the constructed ACK, the data transmission apparatus sends the ACK returned by the terminal to the sender and records the SN of the TCP ACK returned by the receiver.

Figure 7:
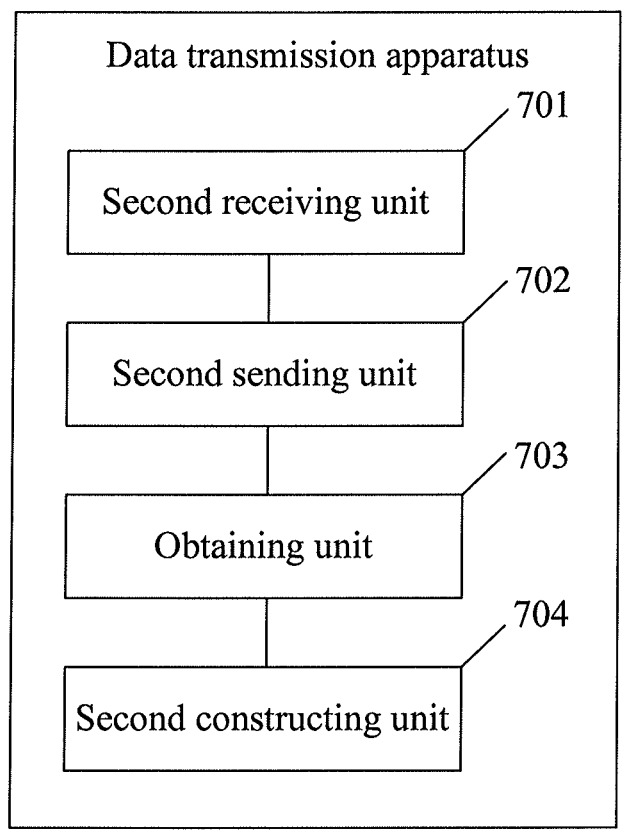
FIG. 7 shows a structure of a data transmission apparatus according to another embodiment of the present disclosure.

Another data transmission apparatus is provided in an embodiment of the present disclosure. As shown in FIG. 7, the apparatus may include a second receiving unit 701, a second sending unit 702, an obtaining unit 703, and a second constructing unit 704.

The second receiving unit 701 is configured to receive the data packet sent by the sender.

The second sending unit 702 is configured to send the received data packet to a receiver through a protocol layer.

The received data packet may be sent to the receiver through a protocol layer. The protocol layer may be an RLC layer.

The obtaining unit 703 is configured to obtain information about the corresponding data packet according to confirmation information of a data packet after the protocol layer receives the confirmation information of the data packet sent by the receiver to the sender.

A confirmation mechanism exists between the protocol layer and the receiver. After receiving the data packet from the sender, the receiver returns confirmation information to the protocol layer. The confirmation information may serve as a basis for determining which data packets are correctly received by the receiver, and which data packets on the data transmission apparatus are correctly received by the receiver. In this way, the information about the data packet corresponding to such data packets can be obtained. The information about the data packet may be an SN of the data packet. If the data packet is a TCP packet, the information about the data packet may further include the TCP SN and packet length of the TCP packet. The packet length and the TCP SN of the TCP packet may be obtained from the packet header information of the TCP packet.

The second constructing unit 704 is configured to construct ACK destined for the sender according to the information about the data packet obtained by the obtaining unit 703.

If the protocol layer has received the confirmation information of a data packet from the receiver but the data transmission apparatus has received no ACK from the receiver in response to the data packet, it can be determined that the receiver has correctly received the data packet sent by the sender, the corresponding information about the data packet can be obtained according to the confirmation information received by the protocol layer, and the second constructing unit 704 may construct an ACK and send it to the sender according to the information about the data packet. The ACK may be constructed according to the information about the data packet obtained by the obtaining unit 703. If the data packet is a TCP packet, the SN of the constructed ACK is the SN plus the packet length of the TCP packet. For other types of data packets, the ACK may be constructed in other ways.

The data transmission apparatus may be a TCP function enhancement entity, for example a TCP proxy, added in an intermediate node in the data transmission process between the sender and the receiver.

The data transmission apparatus provided in this embodiment constructs an ACK and sends it to the sender actively.

Further, before the ACK is constructed, the data transmission apparatus may judge whether the TCP ACK returned by the receiver in response to the corresponding data packet has been received. If no such TCP ACK has been received, the data transmission apparatus constructs an ACK and sends it to the sender. After receiving the TCP ACK from the receiver, the data transmission apparatus may judge whether the ACK has been constructed and sent to the sender, and forward the TCP ACK to the sender if no such ACK has been constructed or discard the TCP ACK returned by the receiver if such an ACK has been constructed.

Figure 8:
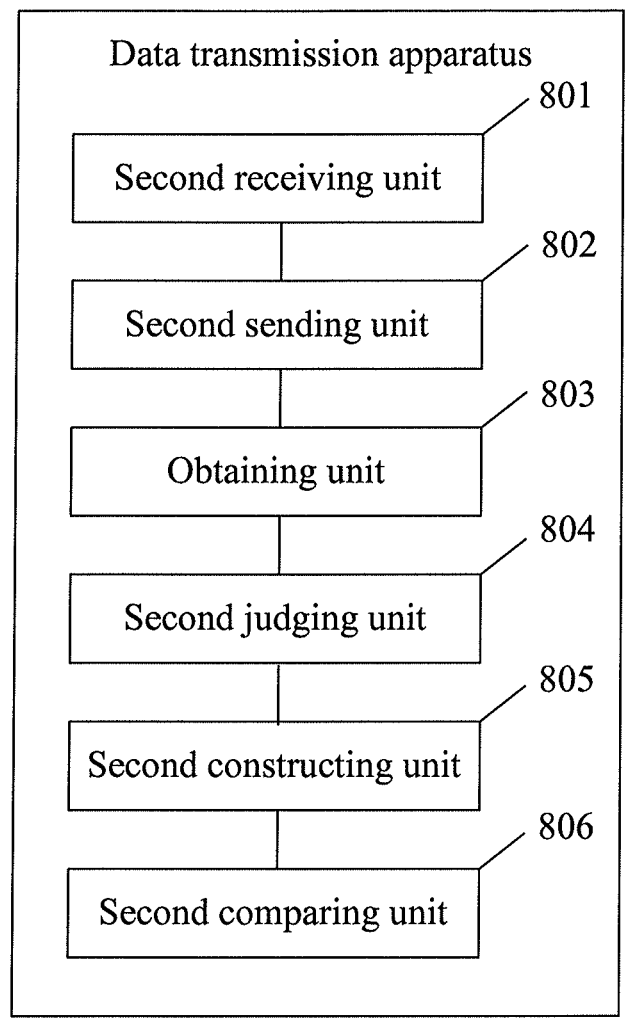
FIG. 8 shows a structure of a data transmission apparatus according to another embodiment of the present disclosure.

Another data transmission apparatus is provided in another embodiment of the present disclosure. As shown in FIG. 8, the apparatus may include a second receiving unit 801, a second sending unit 802, an obtaining unit 803, a second judging unit 805, a second constructing unit 804, and a second comparing unit 806.

The second receiving unit 801 is configured to receive the data packet sent by the sender.

The functions and the implementation process of the second receiving unit 801 are basically the same as those of the second receiving unit 701 in the previous embodiment described above.

The second sending unit 802 is configured to send a data packet to the receiver through a protocol layer, where the data packet is received by the second receiving unit 801.

The functions and the implementation process of the second sending unit 802 are basically the same as those of the second sending unit 702 in the previous embodiment described above.

The obtaining unit 803 is configured to obtain the SN of a data packet according to confirmation information of a data packet, and may be further configured to obtain the packet length and the TCP SN of a TCP packet according to the SN of the data packet.

A confirmation mechanism exists between the protocol layer and the receiver. After receiving the data packet from the sender, the receiver returns confirmation information to the protocol layer. The obtaining unit 803 obtains the corresponding information about the data packet according to the confirmation information.

The second judging unit 805 is configured to judge whether it is necessary to construct an ACK according to the information about data packet obtained by the obtaining unit 803.

The information about the data packet may include the SN of the data packet. Therefore, the SN of the data packet can be obtained according to the confirmation information. If the data packet is a TCP packet, the packet length and the SN of the TCP packet can be obtained according to the SN of the data packet. The SN of the ACK to be constructed can be obtained according to the information about the data packet. For example, for a TCP packet, if the SN of the first data packet is 1 and the packet length of the first data packet is 1460, the SN of the ACK to be constructed is 1461, and if the SN of the second data packet is 1461, the SN of the ACK to be constructed is 2921, and so on. For other types of data packets, the ACK may be constructed in other ways.

The second judging unit 805 can judge whether it is necessary to construct an ACK by comparing the SN of the TCP ACK returned by the receiver with the SN of the ACK to be constructed. The second judging unit 805 may record at least one SN of the TCP ACK returned by the terminal. The second judging unit 805 may compare the maximum SN of the TCP ACK returned by the receiver with the SN of the ACK to be constructed. If the maximum SN of the TCP ACK returned by the receiver is greater than or equal to the SN of the ACK to be constructed, it indicates that the data transmission apparatus has received the TCP ACK returned by the receiver and that no more ACK needs to be constructed; if the maximum SN of the TCP ACK returned by the receiver is smaller than the SN of the ACK to be constructed, it indicates that the data transmission apparatus has received no TCP ACK returned by the receiver and that an ACK needs to be constructed.

The second constructing unit 804 is configured to construct an ACK and send it to the sender if the second judging unit 805 determines that an ACK needs to be constructed.

If the data transmission apparatus has received no TCP ACK returned by the receiver, the second constructing unit 804 of the data transmission apparatus constructs an ACK actively and sends it to the sender. After receiving the ACK, the sender can slide the window to send new data.

If the data transmission apparatus receives the TCP ACK returned by the receiver, the data transmission apparatus may judge whether the second constructing unit 804 has constructed the corresponding ACK and sent it to the sender, and forward the TCP ACK to the sender if no such ACK has been constructed, or discard the TCP ACK returned by the receiver if such an ACK has been constructed. The data transmission apparatus may further include a second comparing unit 806, which is configured to compare the SN of the TCP ACK returned by the receiver with the SN of the constructed ACK recorded in the data transmission apparatus.

If the SN of the TCP ACK returned by the receiver is smaller than or equal to the maximum SN of the constructed ACK, it indicates that the data transmission apparatus has sent the confirmation information to the sender, and the data transmission apparatus may discard the ACK sent by the receiver rather than forward the ACK to the sender. If the SN of the TCP ACK returned by the receiver is greater than the maximum SN of the constructed ACK, the data transmission apparatus sends the ACK returned by the receiver to the sender and records the SN of the TCP ACK returned by the receiver.

Figure 9:
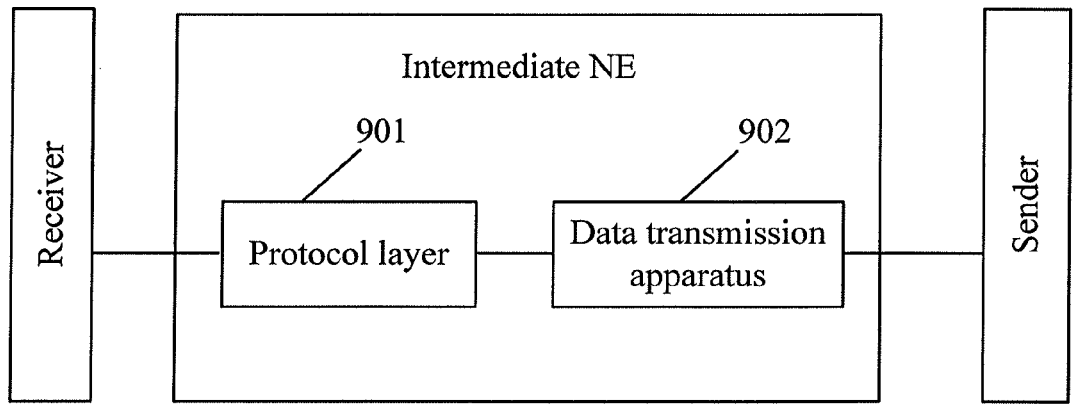
FIG. 9 shows a structure of an intermediate NE according to an embodiment of the present disclosure.

An intermediate NE is provided in another embodiment of the present disclosure. As shown in FIG. 9, the intermediate NE may include a protocol layer 901 and a data transmission apparatus 902. The protocol layer 901 may be any protocol layer of the intermediate NE so long as a confirmation mechanism exists between the protocol layer and the receiver. According to the confirmation mechanism, the receiver returns confirmation information to the protocol layer upon receiving a data packet. The data transmission apparatus 902 may be the apparatus described in the embodiment corresponding to FIG. 5 or FIG. 6. The protocol layer 901 and the data transmission apparatus 902 share the data packet mapping. For the method of generating the data packet mapping, see the relevant description in the foregoing method embodiments. After the protocol layer 901 receives the confirmation information from the receiver, the data transmission apparatus 902 may construct an ACK and send it to the sender; or judge whether it is necessary to construct an ACK and then construct an ACK and send it to the sender. For details of the judging method, see the relevant description in the foregoing method embodiments. The data transmission apparatus 902 may also judge whether the ACK sent by the receiver to the data transmission apparatus 902 needs to be forwarded to the sender. For the judging method, see the relevant description in the foregoing method embodiments.

It should be noted that the intermediate NE above may be a Radio Network Controller (RNC). In this case, the data transmission apparatus 902 may be a TCP proxy, and the protocol layer 901 may be an RLC layer.

In the foregoing embodiment, the protocol layer 901 and the data transmission apparatus 902 are located in the same intermediate NE. However, the data transmission apparatus 902 and the protocol layer 901 may be located in different intermediate NEs so long as the data transmission apparatus 902 can construct an ACK according to the data packet mapping between them.

Through the data transmission apparatus provided in this embodiment, an ACK is constructed and sent to the sender.

Figure 10:
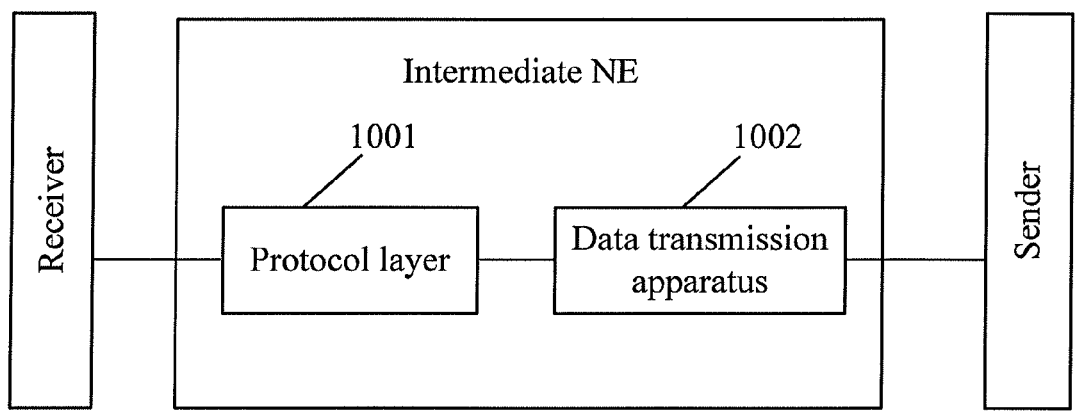
FIG. 10 shows a structure of an intermediate NE according to another embodiment of the present disclosure.

An intermediate NE is provided in another embodiment of the present disclosure. As shown in FIG. 10, the intermediate NE may include a protocol layer 1001 and a data transmission apparatus 1002. The data transmission apparatus 1002 may be the apparatus described in the embodiment corresponding to FIG. 7 or FIG. 8. The protocol layer 1001 may be any protocol layer of the intermediate NE so long as a confirmation mechanism exists between the protocol layer and the receiver. According to the confirmation mechanism, the receiver returns confirmation information to the protocol layer 1001 upon receiving a data packet.

After the protocol layer 1001 receives the confirmation information returned by the receiver, the data transmission apparatus 1002 obtains the information about the data packet according to confirmation information, and constructs an ACK destined for the sender according to the information about the data packet. The data transmission apparatus 1002 may construct an ACK and send it to the sender, or judge whether an ACK needs to be constructed and then construct an ACK and send it to the sender when necessary. For details of the judging manner, see the relevant description in the foregoing method embodiments. The data transmission apparatus may also implement judging whether the ACK sent by the receiver to the data transmission apparatus 1002 needs to be forwarded to the sender.

The intermediate NE above may be an RNC. In this case, the data transmission apparatus 1002 may be a TCP proxy, and the protocol layer 1001 may be an RLC layer.

In the foregoing embodiment, the data transmission apparatus 1002 and the protocol layer 1001 are located in the same intermediate NE. However, the data transmission apparatus 1002 and the protocol layer 1001 may be located in different intermediate NEs.

Through the data transmission apparatus provided in this embodiment, an ACK is constructed and sent to the sender.

The steps of the method or algorithm described herein may be implemented through hardware, or through a software module executed by a processor, or through both. The software module may be located in a Random Access Memory (RAM), a computer memory, a Read Only Memory (ROM), an electrically programmable ROM, an electrically erasable programmable ROM, a register, a hard disk, a removable disk, a Compact-Disk Read Only Memory (CD-ROM), or any other form of storage media well-known in the art.

Although the disclosure is described through some exemplary embodiments, the disclosure is not limited to such embodiments. It is apparent that those skilled in the art can make modifications and variations to the disclosure without departing from the spirit and scope of the disclosure. The disclosure is intended to cover the modifications and variations provided that they fall within the scope of protection defined by the following claims or their equivalents.

What is claimed is:

1. A data transmission method, comprising:
receiving, by a transmission control protocol (TCP) function enhancement entity, a data packet from a sender;
communicating, by the TCP function enhancement entity, via a radio link control, the received data packet to a receiver;
after confirmation information of the data packet is received by the radio link control layer from the receiver, the confirmation information indicating a receipt by the radio link control layer from the receiver, obtaining, by the TCP function enhancement entity, information about the data packet according to the confirmation information by looking up a data packet mapping shared between the TCP function enhancement entity and the radio link control layer;
if no acknowledgement message for receipt of the data packet at the receiver is received by the TCP function enhancement entity from the receiver, constructing, by the TCP function enhancement entity, an acknowledgement (ACK) to indicate that the data packet is correctly received by the receiver, according to the obtained information about the data packet; and
sending, by the TCP function enhancement entity, the constructed ACK to the sender;

wherein the data packet mapping comprises a relationship between the data packet received at the TCP function enhancement entity and a data packet received by the radio link control layer;

wherein the data packet is a TCP packet, and the step of constructing the ACK comprises: constructing, by the TCP function enhancement entity, the ACK according to a packet length and a TCP sequence number (SN) of the TCP packet, wherein a SN of the constructed ACK is equal to the packet length plus the TCP SN.

2. The data transmission method according to claim 1, further comprising:

recording, by the TCP function enhancement entity, the information about the received data packet.

3. The data transmission method according to claim 2, wherein recording, by the TCP function enhancement entity, the information about the received data packet comprises:

recording, by the TCP function enhancement entity, a sequence number (SN) of the received data packet according to an order of receiving the data packet.

4. The data transmission method according to claim 3, wherein:

the data packet is a TCP packet, the step of recording the information about the received packet further comprises:

recording, by the TCP function enhancement entity, a packet length and a TCP SN of the TCP packet.

5. The data transmission method according to claim 1, wherein the receiver is a terminal, and the data packet is a downlink data packet destined for the terminal from the sender.

6. A transmission control protocol (TCP) function enhancement entity, comprising:

a receiving unit configured to receive a data packet from a sender;

a sending unit configured to communicate the received data packet to a receiver through a radio link control (RLC) layer;

an obtaining unit configured to, after confirmation information for receipt of the data packet at the receiver is received by the RLC layer from the receiver, obtain information about the received data packet according to the confirmation information by looking up a data packet mapping shared between the TCP function enhancement entity and the RLC layer;

a constructing unit configured to construct an acknowledgement (ACK) for receipt of the data packet at the receiver according to the obtained information about the data packet, if no confirmation message for receipt of the data packet at the receiver is received by the TCP function enhancement entity from the receiver; and a transmitting unit configured to send the constructed ACK to the sender;

wherein the data packet mapping comprises a relationship between the received data packet recorded at the TCP function enhancement entity and a data packet received by the RLC layer;

wherein the data packet is a TCP packet, the recorded information about the data packet further comprises a packet length and a TCP sequence number (SN) of the TCP packet; and the constructing unit is configured to construct the ACK according to the packet length and the TCP SN of the TCP packet, wherein a SN of the constructed ACK is equal to the packet length of the TCP plus the TCP SN of the TCP packet.

7. The TCP function enhancement entity according to claim 6, wherein the receiving unit is further configured to record the information about the received data packet;

the information about the received data packet recorded by the receiving unit comprises a sequence number (SN) indicating an order that the data packet is received at the TCP function enhancement entity.

8. The TCP function enhancement entity according to claim 6, wherein the TCP function enhancement entity comprises a TCP proxy.

9. a network element configured to transmit data between a sender and a receiver, the network element comprising:

a transmission control protocol (TCP) function enhancement entity; and a radio link control (RLC) layer, wherein, the TCP function enhancement entity is configured to receive a data packet from the sender, the RLC layer is configured to receive a confirmation information from the receiver, the confirmation information indicating that the data packet is correctly received by the receiver, and the TCP function enhancement entity is further configured to;

after the RLC layer receives the confirmation information from the receiver, obtain information about the data packet according to the confirmation information by looking up a data packet mapping shared between the TCP function enhancement entity and the RLC layer, the data packet mapping comprising a relation between the data packet received at the TCP function enhancement entity and a data packet received by the radio link control layer;

construct an acknowledge (ACK) indicating receipt of the data packet at the receiver based on the obtained information about the data packet if the TCP function enhancement entity does not receive from the receiver a confirmation message for receipt of the data packet at the receiver; and send the constructed ACK to the sender;

wherein the data packet is a TCP packet, the TCP function enhancement entity is configured to construct the ACK according to a packet length of the TCP packet and a TCP sequence number of the TCP packet, wherein a sequence number of the constructed ACK is equal to a sum of the packet length and the TCP sequence number of the TCP packet.

10. The network element according to claim 9, the TCP function enhancement entity is further configured to record the information about the packet data received from the sender.

11. The network element according to claim 10, wherein the data packet received from the sender is a TCP packet, and the recorded information comprises a packet length and a TCP serial number of the received TCP packet.

12. The network element according to claim 9, wherein the network element comprises a radio network controller (RNC).

13. The network element according to claim 9, wherein the data packet comprises a downlink data packet.

* * * * *